United States Patent
Huang et al.

(10) Patent No.: US 9,760,492 B2
(45) Date of Patent: Sep. 12, 2017

(54) METHOD FOR CONTROLLING ACCESS OF CACHE THROUGH USING PROGRAMMABLE HASHING ADDRESS AND RELATED CACHE CONTROLLER

(71) Applicant: MediaTek Singapore Pte. Ltd., Singapore (SG)

(72) Inventors: Hsilin Huang, Cupertino, CA (US); Cheng-Ying Ko, Cupertino, CA (US); Hsin-Hao Chung, Hsinchu (TW); Chao-Chin Chen, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 259 days.

(21) Appl. No.: 14/549,556

(22) Filed: Nov. 21, 2014

(65) Prior Publication Data
US 2016/0147669 A1    May 26, 2016

(51) Int. Cl.
*G06F 12/08* (2016.01)
*G06F 12/0864* (2016.01)
*G06F 12/0817* (2016.01)
*G06F 12/1018* (2016.01)

(52) U.S. Cl.
CPC ........ *G06F 12/0864* (2013.01); *G06F 12/082* (2013.01); *G06F 12/1018* (2013.01); *G06F 2212/1021* (2013.01); *G06F 2212/6032* (2013.04); *G06F 2212/621* (2013.01)

(58) Field of Classification Search
CPC ........... G06F 12/0864; G06F 17/30949; G06F 9/3004; G06F 12/0802; G06F 12/0811; G06F 12/0895; G06F 12/1018
See application file for complete search history.

(56) References Cited

U.S. PATENT DOCUMENTS

| | | | | |
|---|---|---|---|---|
| 5,515,522 | A * | 5/1996 | Bridges | G06F 12/0835 711/118 |
| 8,990,505 | B1 * | 3/2015 | Jamil | G06F 12/0864 711/128 |
| 2004/0024958 | A1 * | 2/2004 | Bains | G06F 12/0864 711/105 |
| 2010/0250966 | A1 * | 9/2010 | Olson | G06F 9/30018 713/190 |
| 2011/0283040 | A1 * | 11/2011 | Chadha | G06F 12/1009 711/3 |

\* cited by examiner

*Primary Examiner* — Reginald Bragdon
*Assistant Examiner* — Thanh Vo
(74) *Attorney, Agent, or Firm* — Winston Hsu (57) ABSTRACT

A method for controlling access of a cache includes at least following steps: receiving a memory address; utilizing a hashing address logic to perform a programmable hash function upon at least a portion of the memory address to generate a hashing address; and determining an index of the cache based at least partly on the hashing address.

16 Claims, 5 Drawing Sheets

METHOD FOR CONTROLLING ACCESS OF CACHE THROUGH USING PROGRAMMABLE HASHING ADDRESS AND RELATED CACHE CONTROLLER

BACKGROUND

The disclosed embodiments of the present invention relate to accessing buffered data (e.g., cached data), and more particularly, to a method for controlling access of a cache through using a programmable hashing address and a related cache controller.

In today's systems, the time it takes to bring data into a processor is very long when compared to the time to process the data. Therefore, a bottleneck forms at the input to the processor. The cache helps by decreasing the time it takes to move information to and from the processor. When the cache contains the information requested, the transaction is said to be a cache hit. When the cache does not contain the information requested, the transaction is said to be a cache miss. In general, the hit rate is a critical performance index of the cache. How to increase the hit rate has become an issue in the field.

In general, the cache may be a fully associative cache, a direct-mapped cache, or a set-associative cache. The set-associative cache is a hybrid between the fully associative cache and the direct-mapped cache, and may be considered a reasonable compromise between the hardware complexity/latency of the fully associative cache and the direct-mapped cache. No matter which cache design is employed, there is a need to improve the hit rate. For example, when the cache size is 4 KB (Kilobytes), the cache is used to preload a 32×32 image from a 1024×768 image with 32 bpp (bit per pixel). In a linear address surface (image), an address offset from a pixel (X, Y) in a current scan line to a pixel (X, Y+1) in a next scan line is equal to a byte count of an image pitch of the image. Since the image pitch of the 1024×768 image is 1024, the byte count of the image pitch is 4 KB. Consider a case where the 1024×768 image is divided into a plurality of bins, each being a 32×32 image, and is processed in a bin-by-bin manner. The byte count of the image pitch is equal to the cache size, that is, the pitch of scan line is 4 KB which is just the size of cache capacity size 4 KB. If we didn't change the address mapping of the image to bank and set of the cache, all of the 32 scan lines will hit the same bank and the same set. For a direct mapping scheme, there is only one scan line of the 32×32 image that can be read into the cache. The next scan line of the 32×32 image will map to the same cache line and replace the current existing scan line in the cache. For a 4-way associative scheme, only 4 scan lines of the 32×32 image can be kept in the cache. The other 28 scan lines of the 32×32 image will map and try to replace the current 4 scan lines that contained data of the first 4 scan lines of the image in the cache. As a result, the miss rate will be high due to the fact that only a small number of scan lines of the 32×32 image can be kept in the cache. Further, the data preloading of the 32×32 image will be invalid because all of the scan lines in the 32×32 image cannot be kept in the cache at the same time.

Thus, there is a need for an innovative cache addressing design to preload most or all image data of a bin into a cache, thus improving the hit rate and reducing the data processing latency.

SUMMARY

In accordance with exemplary embodiments of the present invention, a method for controlling access of a cache through using a programmable hashing address and a related cache controller are proposed to solve the above problem.

According to a first aspect of the present invention, an exemplary method for controlling access of a cache is disclosed. The exemplary method includes: receiving a memory address; utilizing a hashing address logic to perform a programmable hash function upon at least a portion of the memory address to generate a hashing address; and determining an index of the cache based at least partly on the hashing address.

According to a second aspect of the present invention, an exemplary cache controller for controlling access of a cache is disclosed. The exemplary cache controller includes an input interface, a hashing address logic, and a control circuit. The input interface is configured to receive a memory address. The hashing address logic is configured to perform a programmable hash function upon at least a portion of the memory address to generate a hashing address. The control circuit is configured to determine an index of the cache based at least partly on the hashing address.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
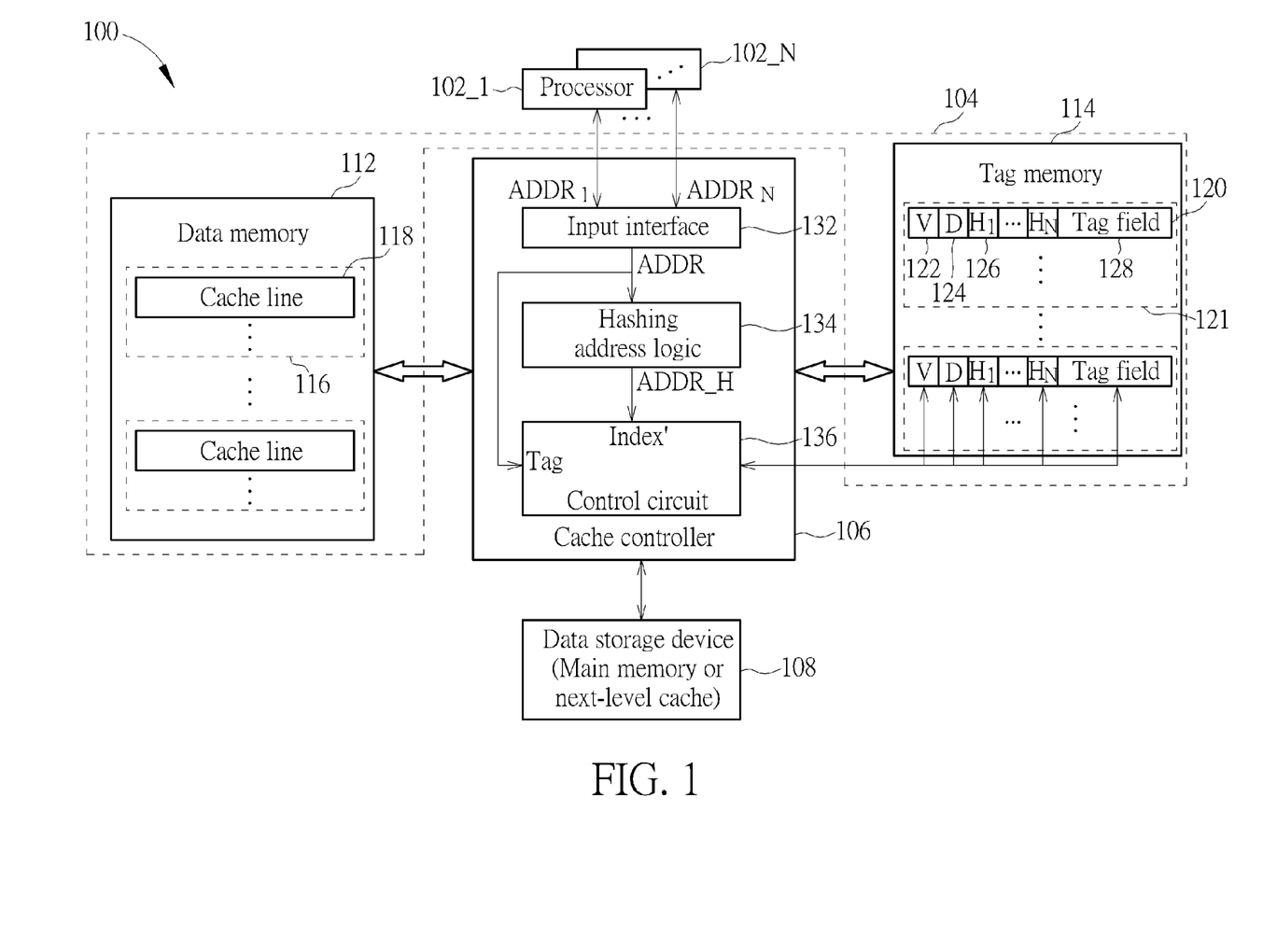
FIG. 1 is a block diagram illustrating a data processing system according to an embodiment of the present invention.

FIG. 1 is a block diagram illustrating a data processing system according to an embodiment of the present invention. The data processing system 100 may be part of an electronic device. By way of example, the data processing system 100 may be a graphics processing system. In this embodiment, the data processing system 100 includes one or more processors (e.g., central processing units or graphics processing units) 102_1-102_N, a cache 104, a cache controller 106, and a data storage device (e.g., a main memory or a next-level cache) 108. The processors 102_1-102_N are request agents of the cache 104. It should be noted that the number of processors 102_1-102_N may be adjusted, depending upon actual application requirement.

The cache 104 is a small-sized storage device (e.g., a static random access memory (SRAM) device with a faster data access speed), and can be implemented in a graphics processing system or any application requiring faster information transaction between processor(s) and a large-sized storage device (e.g., a dynamic random access memory (DRAM) device with a slower data access speed). As shown in FIG. 1, the cache 104 includes a data memory 112 and a tag memory 114. The data memory 112 may have a plurality of banks 116, each including a plurality of cache lines 118. For example, the data memory 112 may be implemented using SRAMs for storing cached data, and each of the cache lines 118 may be configured to have a designated cache line size (e.g., 1K bits). The tag memory 114 may be a tag RAM having a plurality of tag entries 120 stored therein. Similarly, the tag memory 114 may have a plurality of banks 121, each including a plurality of tag entries 120. As tag entries in different banks can be read concurrently, the cache controller 106 therefore can obtain multiple tag entries in one cycle.

In one exemplary design, the data memory 112 and the tag memory 114 may be allocated in different storage spaces of the same memory device. In another exemplary design, the data memory 112 and the tag memory 114 may be allocated in distinct memory devices.

In this embodiment, each of the tag entries 120 is associated with one cache line 118 allocated in the data memory 112, and has a plurality of status bits (e.g., a valid bit "V" 122, a dirty bit "D" 124, and one or more hash enable bits "$H_1$"-"$H_N$" 126) and a tag field 128. The tag entries 120 are set by the cache controller 106. The valid bit 122 records whether or not the cache line 118 associated with this tag entry contains valid data. The valid bit 122 of each tag entry is initially set to indicate an invalid state (i.e., V=0). When data fetched from the data storage device 108 is stored into a cache line 118, the valid bit 122 of a corresponding tag entry associated with this cache line 118 is set to indicate a valid state (i.e., V=1). The dirty bit 124 records whether or not the cached data associated with this tag entry should be written back to a main memory. It should be noted that the dirty bits 124 are used by write-back cache only. When the cache 104 is a write-through cache, the dirty bit 124 in each tag entry can be omitted. The hash enable bits 126 are set for different request agents such as the processors 102_1-102_N assigned with different process address space identifiers (PASIDs) or processor IDs. Since the cache 104 is shared by different request agents, each of the hash enable bits 126 is set to indicate whether one programmable hash function proposed by the present invention has been enabled for a memory address issued from a corresponding request agent. For example, when a memory address included in a write request issued from the processor 102_1 is processed by a designated programmable hash function to create a cache index pointing to a specific tag entry 120, the hash enable bit $H_1$ of the specific tag entry 120 is set to indicate an enable state (i.e., $H_1$=1); and when a memory address included in a write request issued from the processor 102_1 is processed in a typical manner to create a cache index pointing to a tag entry 120, the hash enable bit $H_1$ is set to indicate a disable state (i.e., $H_1$=0). Regarding the tag field 128, it contains a tag address derived from a portion of the original memory address, where the tag address corresponds to data stored in a cache line 118 associated with this tag entry.

The cache controller 106 is coupled between the data memory 112 and the tag memory 114, and is arranged to control access of the cache 104. For example, the cache controller 106 may snoop the bus activities of the processors 102_1-102_N, and determines if a memory address for requested data causes a cache hit or a cache miss. When a cache hit is identified by the cache controller 106, the cache controller 106 fetches the requested data from one cache line 118 and returns the requested data to one of the processors 102_1-102_N that issues the request. When a cache miss is identified by the cache controller 106, the cache controller 106 follows a replacement rule to update one cache line 118 and associated tag entry, and returns the requested data fetched from the data storage device 108 to one of the processors 102_1-102_N that issues the request.

When a cache miss occurs, the requested data has to be retrieved from the data storage device 108, thus increasing the data access latency. As mentioned above, when the byte count of a pitch of an image (e.g., a 1024×768 image with 32 bpp) is equal to a cache size (e.g., 4 KB), a small number of scan lines of a partial image (e.g., a 32×32 image with 32 bpp) can be kept in a cache, thus resulting in a high cache miss rate. To increase the cache hit rate, the present invention proposes changing a portion of an original memory address issued from a request agent (e.g., a processor) according to an image pitch of an image having at least one partial image to be loaded into a cache. In this way, cache indices (e.g., set addresses) generated for scan lines of the partial image may be different from each other. That is, due to the proposed programmable hash function, all of the scan lines of the partial image may not hit same bank and same set. Further, since the hash function is programmable, the proposed cache addressing scheme can meet different requirements (e.g., different image sizes). Details of the proposed cache addressing scheme are described as below.

In this embodiment, the cache controller 106 includes a plurality of circuit blocks, such as an input interface 132, a hashing address logic 134, and a control circuit 136. The input interface 132 is configured to receive memory addresses ADDR_1-ADDR_N included in read/write requests issued from the processors 102_1-102_N. By way of example, the input interface 132 may have arbitration/scheduling capability and output one received memory address ADDR at a time to the hashing address logic 134 for further processing. The hashing address logic 134 is configured to perform a programmable hash function upon at least a portion of the memory address ADDR to generate a hashing address ADDR_H. The control circuit 136 is configured to control access of the cache 104 according to a tag derived from the memory address and an index Index' derived from the hashing address ADDR_H. For example, the control circuit 136 refers to the index Index' to find a tag entry 120 in the tag memory 114, and performs tag comparison according to the tag derived from the memory address and a tag recorded in the tag entry 120 found using the index Index'. In addition, the control circuit 136 further performs data management upon the data memory 112 and the tag memory 114. For example, the hash enable bits 126 of each tag entry are set by the control circuit 136 for different PASIDs or processor IDs. Further, one cache line and one associated tag entry will be updated by the control circuit 136 when a cache miss occurs.

As mentioned above, the hashing address logic 134 is responsible for generating a hashing address ADDR_H used to determine a cache index (e.g., a set address). In this embodiment, the programmable hash function employed by the hashing address logic 134 may have different hash function settings (e.g., different numbers of shifting/rotating bit positions) for different image sizes (e.g., different image pitches). For example, when an image with at least one partial image (e.g., a 32×32 image) to be loaded into the cache 104 has a first image size (e.g., 1024×768), the hashing address logic 134 may employ the programmable hash function configured by a first hash function setting; and when the image with the at least one partial image (e.g., a 32×32 image) to be loaded into the cache 104 has a second image size (e.g., 1920×1080) different from the first image size, the hashing address logic 134 may employ the programmable hash function configured by a second hash function setting different from the first hash function setting. In this way, the programmable hash function can be adaptively set based on the image size of an image to thereby prevent multiple scan lines of a partial image in the image from hitting same bank and same set of the cache 104.

In an exemplary design, the programmable hash function is a bit shift operation such as a logical shift operation or a circular shift operation (or called bit rotation), where the number of bit positions shifted/rotated by the bit shift operation is adaptively set by the hashing address logic 134 based on an image size of an image having at least one partial image to be loaded into the cache 104, and/or the number of address bits actually shifted/rotated by the bit shift operation is adaptively set by the hashing address logic 134 based at least partly on the cache size of the cache 104 (i.e., data amount of all cache lines 118 in the data memory 112 of the cache 104). For better understanding of technical features of the hashing address logic 134, several examples of the bit shift operation are given as below.

Figure 2:
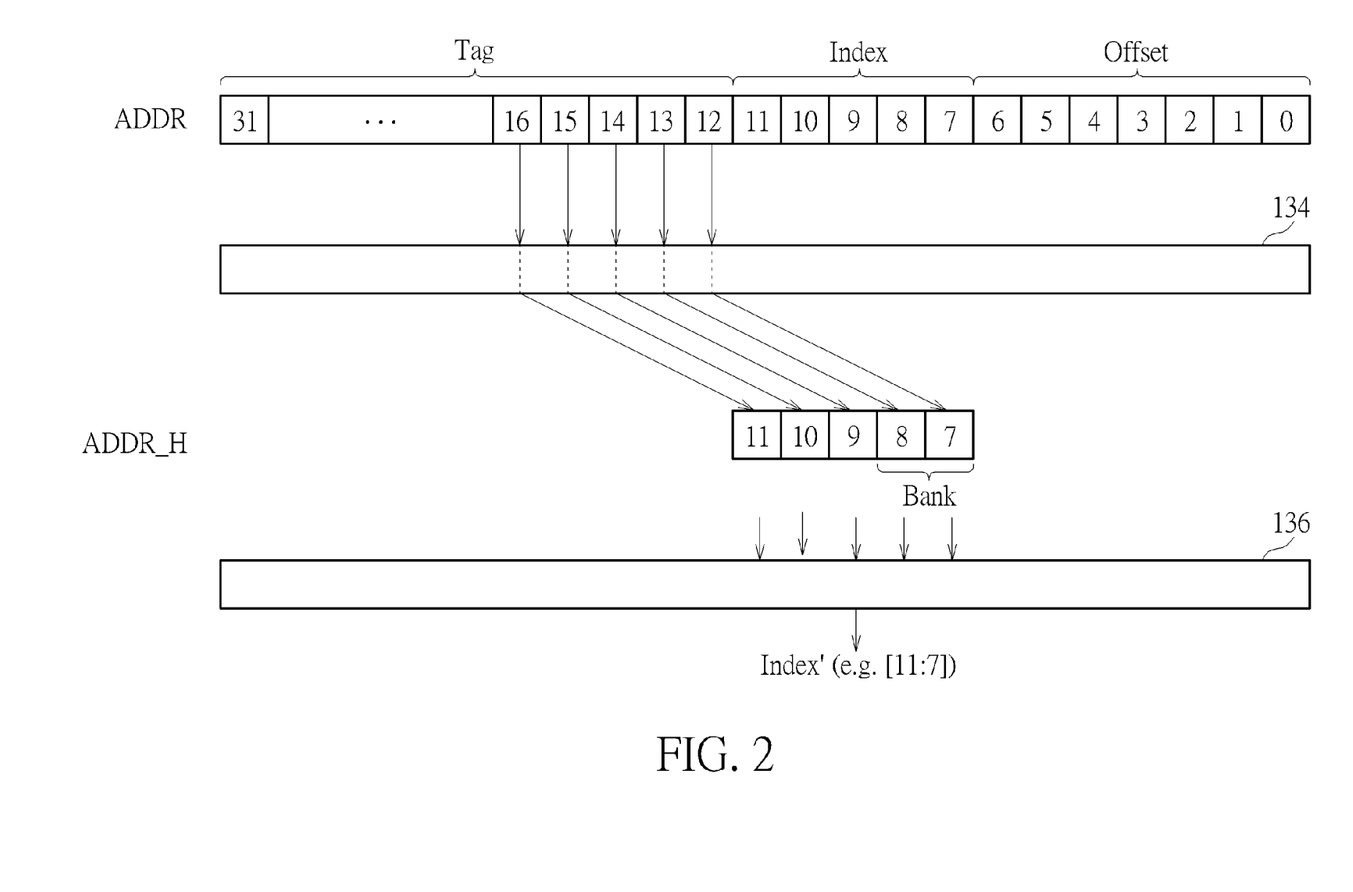
FIG. 2 is a diagram illustrating a bit shift operation for hashing address bits including bank information according to an embodiment of the present invention.

FIG. 2 is a diagram illustrating a bit shift operation for hashing address bits including bank information according to an embodiment of the present invention. In this example, the data memory 112 of the cache 104 may have 4 banks 116, each bank 116 may have 8 cache lines 118, and each cache line 118 may have 1K bits (i.e., 128 bytes). Hence, the cache size of the cache 104 is equal to 4K bytes (i.e., 8K bits×4). For a 32 bpp linear address surface (image), there is a 1024×768 image, and each bin of the 1024×768 image is a 32×32 image. The byte count of the image pitch is 4K bytes (i.e., 1024×4 bytes), which is equal to the cache size of the cache 104. Further, the cache 104 may employ a direct mapping scheme, and each of the processors 102_1-102_N may be a 32-bit processor.

Since the cache line size is 128 bytes (i.e., $2^7$ bytes), seven address bits [6:0] of the 32-bit memory address ADDR included in the original request issued by one of the processors 102_1-102_N is used to serve as an offset. Since the number of cache lines in the cache 104 is 32 (i.e., $2^5$), five address bits [11:7] of the 32-bit memory address ADDR included in the original request issued by one of the processors 102_1-102_N is originally used to serve as an index (e.g., a set address) for finding a tag entry 120 in the tag memory 114, where the address bits [8:7] may also act as a bank address for selecting one of the banks 121 in the tag memory 114. The remainder of the 32-bit memory address ADDR (i.e., address bits [31:12]) acts as a tag used for tag comparison to determine where there is a cache hit or a cache miss. Since the byte count of the image pitch is 4K bytes, each scan line's addressing is 4K bytes apart. In other words, an address offset from a pixel (X, Y) in a current scan line to a pixel (X, Y+1) in a next scan line is equal to 4K bytes (i.e., $2^{12}$ bytes). 4K may be represented by 0x1000 in the hexadecimal representation or 0001 0000 0000 0000 in the binary representation. Hence, one 4K-byte address offset only affects the address bit [12] of the 32-bit memory address ADDR, and has no impact on the index (i.e., address bits [11:7]). In a typical cache addressing design, multiple scan lines of the 32×32 image have the same cache index, thus hitting same bank and same set. To make the cache index changed for each 4K-byte address offset, the proposed hashing address logic 136 therefore performs the bit shift operation upon at least a portion of the 32-bit memory address ADDR. For example, the proposed hashing address logic 136 may make addresses indicated by address bits [11:7] of all scan lines of the 32×32 image look like contiguous. Therefore, all scan lines of the 32×32 image can be successfully preloaded into the cache 104.

The hashing address logic 134 may refer to a cache size of the cache 104 to adaptively set the number of address bits that are selected from the 32-bit memory address ADDR to be processed by the programmable bit shift operation. In this example, the data memory 112 of the cache 104 has 4 banks 116, each bank 116 has 8 cache lines 118, and each cache line 118 has 1K bits (i.e., 128 bytes). Since the cache size of the cache 104 is equal to 4K bytes (i.e., 8K bits×4), there are 32 128-byte cache lines. The number of address bits selected from the 32-bit memory address ADDR to be processed by the programmable bit shift operation may be set by a value not smaller than 5 (i.e., $Log_2 32=5$). For example, when the bin size is larger, the number of address bits selected from the 32-bit memory address ADDR to be processed by the programmable bit shift operation may be set by a larger value; and when the bin size is smaller, the number of address bits selected from the 32-bit memory address ADDR to be processed by the programmable bit shift operation may be set by a smaller value. It should be noted that, when the cache controller 106 is used for controlling access of another cache with a different cache size, the number of address bits selected from the original memory address to be processed by the programmable bit shift operation may be adjusted correspondingly.

As mentioned above, address bits [6:0] are used as an offset and only the address bit [12] is affected by one 4K-byte address offset (i.e., 0x1000), the programmable bit shift operation may rotate right (ror) the selected address bits [16:12] by 5 (i.e., 12–7) bit positions, thereby generating the hashing address ADDR_H composed of rotated address bits. Specifically, concerning one 4K-byte address offset (i.e., 0x1000), the non-zero address bit with the lowest bit position is the address bit [12]. To make the cache index changed for each 4K-byte address offset, the address bit [12] is required to be shifted/rotated to the bit position where the address bit [7] is located. As can be seen from FIG. 2, the address bits [16:12] in the original memory address ADDR are therefore rotated right to bit positions where the address bits [11:7] are located, respectively.

The control circuit 136 is configured to determine an index Index' of the cache 104 based at least partly on the hashing address ADDR_H. In this example, the control circuit 136 may extract address bits [16:12] rotated/shifted right to bit positions of the address bits [11:7] as the index Index'. In other words, the address bits [11:7] in the original memory address ADDR is not actually used to act as a cache index. Instead, the cache controller 106 uses the index Index' derived from the hashing address ADDR_H to find a tag entry 120 in the tag memory 114. It should be noted that the tag address used for tag comparison is still derived from the original memory address ADDR. That is, the control circuit 136 is configured to compare address bits [31:12] in the original memory address ADDR with a tag address stored in a tag field of the tag entry 120 found using the index Index'.

A memory address of each scan line in the 1024×768 image with 32 bpp may be represented by a base address plus an offset. Let's ignore the base address and consider the offset only. The cache indices Index' generated for all scan lines in the 1024×768 image with 32 bpp are listed in following table.

TABLE 1

| | Original offset (Hexadecimal) | 4 KB New offset bits [11:7] after rotating (cross bank) - ror 5 [8:7] = bank |
|---|---|---|
| Scan line 0 | 0x00000000 | 5'b00000 [bank 00] |
| Scan line 1 | 0x00001000 | 5'b00001 [bank 01] |
| Scan line 2 | 0x00002000 | 5'b00010 [bank 10] |
| Scan line 3 | 0x00003000 | 5'b00011 [bank 11] |
| Scan line 4 | 0x00004000 | 5'b00100 [bank 00] |
| Scan line 5 | 0x00005000 | 5'b00101 [bank 01] |
| Scan line 6 | 0x00006000 | 5'b00110 [bank 10] |
| Scan line 7 | 0x00007000 | 5'b00111 [bank 11] |
| Scan line 8 | 0x00008000 | 5'b01000 [bank 00] |
| Scan line 9 | 0x00009000 | 5'b01001 [bank 01] |
| Scan line 10 | 0x0000a000 | 5'b01010 [bank 10] |
| Scan line 11 | 0x0000b000 | 5'b01011 [bank 11] |
| Scan line 12 | 0x0000c000 | 5'b01100 [bank 00] |
| Scan line 13 | 0x0000d000 | 5'b01101 [bank 01] |
| Scan line 14 | 0x0000e000 | 5'b01110 [bank 10] |
| Scan line 15 | 0x0000f000 | 5'b01111 [bank 11] |
| Scan line 16 | 0x00010000 | 5'b10000 [bank 00] |
| Scan line 17 | 0x00011000 | 5'b10001 [bank 01] |
| Scan line 18 | 0x00012000 | 5'b10010 [bank 10] |
| Scan line 19 | 0x00013000 | 5'b10011 [bank 11] |
| Scan line 20 | 0x00014000 | 5'b10100 [bank 00] |
| Scan line 21 | 0x00015000 | 5'b10101 [bank 01] |
| Scan line 22 | 0x00016000 | 5'b10110 [bank 10] |
| Scan line 23 | 0x00017000 | 5'b10111 [bank 11] |
| Scan line 24 | 0x00018000 | 5'b11000 [bank 00] |
| Scan line 25 | 0x00019000 | 5'b11001 [bank 01] |
| Scan line 26 | 0x0001a000 | 5'b11010 [bank 10] |
| Scan line 27 | 0x0001b000 | 5'b11011 [bank 11] |
| Scan line 28 | 0x0001c000 | 5'b11100 [bank 00] |
| Scan line 29 | 0x0001d000 | 5'b11101 [bank 01] |
| Scan line 30 | 0x0001e000 | 5'b11110 [bank 10] |
| Scan line 31 | 0x0001f000 | 5'b11111 [bank 11] |

It should be noted that the number of bit positions shifted or rotated by the programmable bit shift operation is adaptively set by the hashing address logic 134 based on an image size of an image having at least one partial image to be loaded into the cache 104. In other words, when the image pitch is changed, the number of shifting/rotating bit positions will be adjusted correspondingly.

Figure 3:
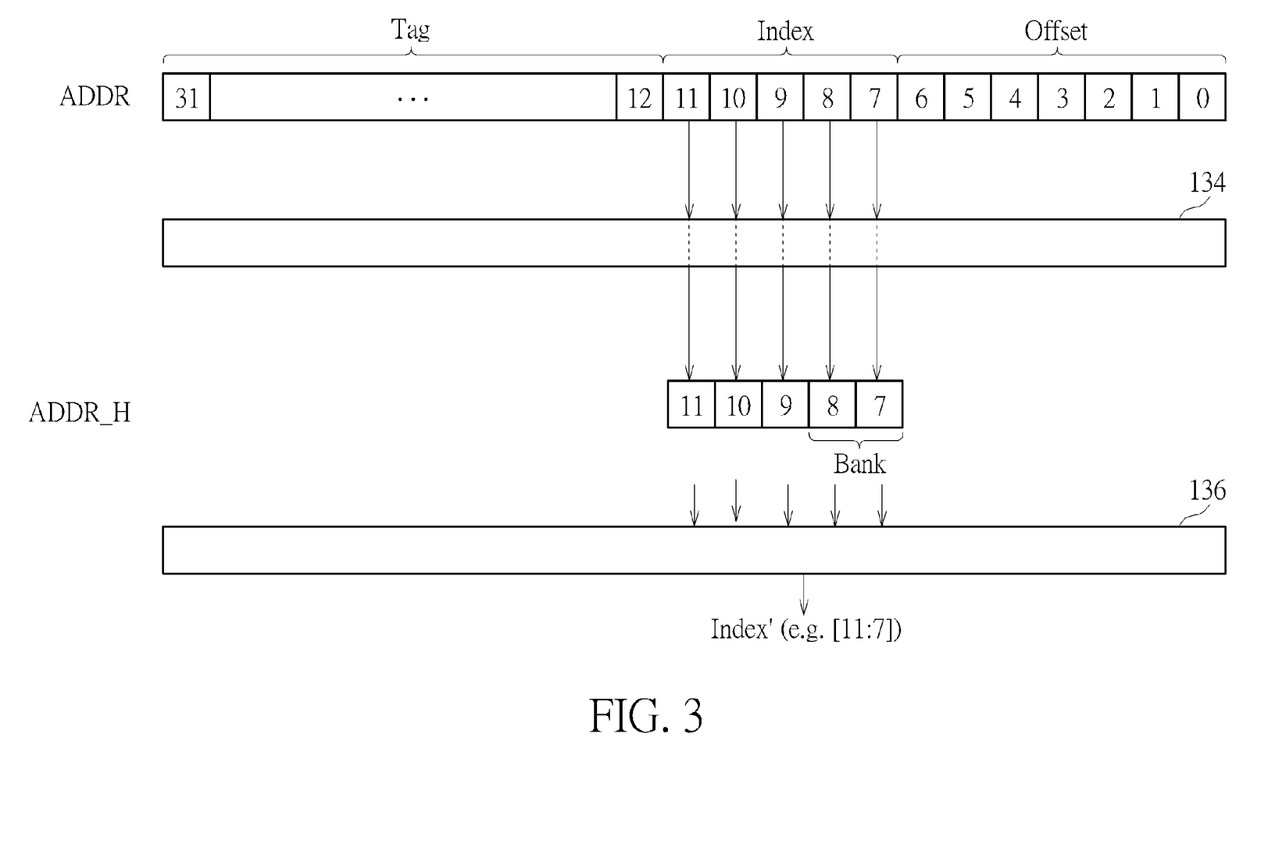
FIG. 3 is a diagram illustrating another bit shift operation for hashing address bits including bank information according to an embodiment of the present invention.

FIG. 3 is a diagram illustrating another bit shift operation for hashing address bits including bank information according to an embodiment of the present invention. In this example, the data memory 112 of the cache 104 may have 4 banks 116, each bank 116 may have 8 cache lines 118, and each cache line 118 may have 1K bits (i.e., 128 bytes). Hence, the cache size is equal to 4K bytes (i.e., 8K bits×4). For a 32 bpp linear address surface (image), there is an 800×600 image, and each bin of the 800×600 image is a 32×32 image. The byte count of the image pitch is 3.2K bytes (i.e., 800×4 bytes), which is different from the byte count of the image pitch of the 1024×768 image mentioned above. Further, the cache 104 may employ a direct mapping scheme, and each of the processors 102_1-102_N may be a 32-bit processor.

Since the cache line size is 128 bytes (i.e., $2^7$ bytes), seven address bits [6:0] of the 32-bit memory address ADDR included in the original request issued by one of the processors 102_1-102_N is used to serve as an offset. Since the number of cache lines in the cache 104 is 32 (i.e., $2^5$), five address bits [11:7] of the 32-bit memory address ADDR included in the original request issued by one of the processors 102_1-102_N is originally used to serve as an index (e.g., a set address) for finding a tag entry 120 in the tag memory 114, where the address bits [8:7] may act as a bank address for selecting one of the banks 121 in the tag memory 114. The remainder of the 32-bit memory address ADDR (i.e., address bits [31:12]) act as a tag used for tag comparison to determine whether there is a cache hit or a cache miss.

Since the byte count of the image pitch is 3.2K bytes, each scan line's addressing is 3.2 Kbytes apart. In other words, an address offset from a pixel (X, Y) in a current scan line to a pixel (X, Y+1) in a next scan line is equal to 3.2K bytes. 3.2K may be represented by 0xc80 in the hexadecimal representation or 1100 1000 0000 in the binary representation. Hence, one 3.2K-byte address offset only affects the address bit [7], address bit [10] and address bit [11] of the 32-bit memory address ADDR.

As mentioned above, the hashing address logic 134 may refer to a cache size of the cache 104 to adaptively set the number of address bits that are selected from the 32-bit memory address ADDR to be processed by the programmable bit shift operation. In this example, the cache size of the cache 104 is equal to 4K bytes (i.e., 8K bits×4), and there are 32 128-byte cache lines. The number of address bits selected from the 32-bit memory address ADDR to be processed by the programmable bit shift operation may be set by a value not smaller than 5 (i.e., $\log_2 32=5$). For example, when the bin size is larger, the number of address bits selected from the 32-bit memory address ADDR to be processed by the programmable bit shift operation may be set by a larger value; and when the bin size is smaller, the number of address bits selected from the 32-bit memory address ADDR to be processed by the programmable bit shift operation may be set by a smaller value.

Further, address bits [6:0] are used as an offset and the address bit [7] is affected by the 3.2K-byte address offset (i.e., 0xc80), the number of bit positions shifted or rotated by the bit shift operation is set by zero (i.e., 7−7). Specifically, concerning one 3.2K-byte address offset (i.e., 0xc80), the non-zero address bit with the lowest bit position is the address bit [7]. Hence, the cache index is changed for each 3.2K-byte address offset, and there is no need to rotate/shift address bits. As can be seen from FIG. 3, the address bits [11:7] in the original memory address ADDR are not shifted/rotated by the hashing address logic 134, such that the hashing address ADDR_H is composed of address bits [11:7] located at the original bit positions.

The control circuit 136 is configured to determine an index Index' of the cache 104 based at least partly on the hashing address ADDR_H. In this example, the control circuit 136 may extract address bits [11:7] at the original bit positions as the index Index'. In other words, the address bits [11:7] in the original memory address ADDR is actually used to act as a cache index (which is derived from the hashing address ADDR_H to find a tag entry 120 in the tag memory 114). It should be noted that the tag address used for tag comparison is still derived from the original memory address ADDR. That is, the control circuit 136 is configured to compare address bits [31:12] in the original memory address ADDR with a tag address stored in a tag field of the tag entry 120 found using the index Index'.

As mentioned above, the programmable bit shift operation is applied to the address bits [11:7], including address bits [8:7] originally used for indexing one of the banks 121 in the tag memory 114 of the cache 104. Hence, the original bank information is not kept due to bit shifting/rotation. To simplify the cache addressing design, the hashing address logic 134 may be modified to perform the bit shift operation upon a portion of the original memory address that does not include address bits (e.g., [8:7]) originally used to serve as a bank address.

Figure 4:
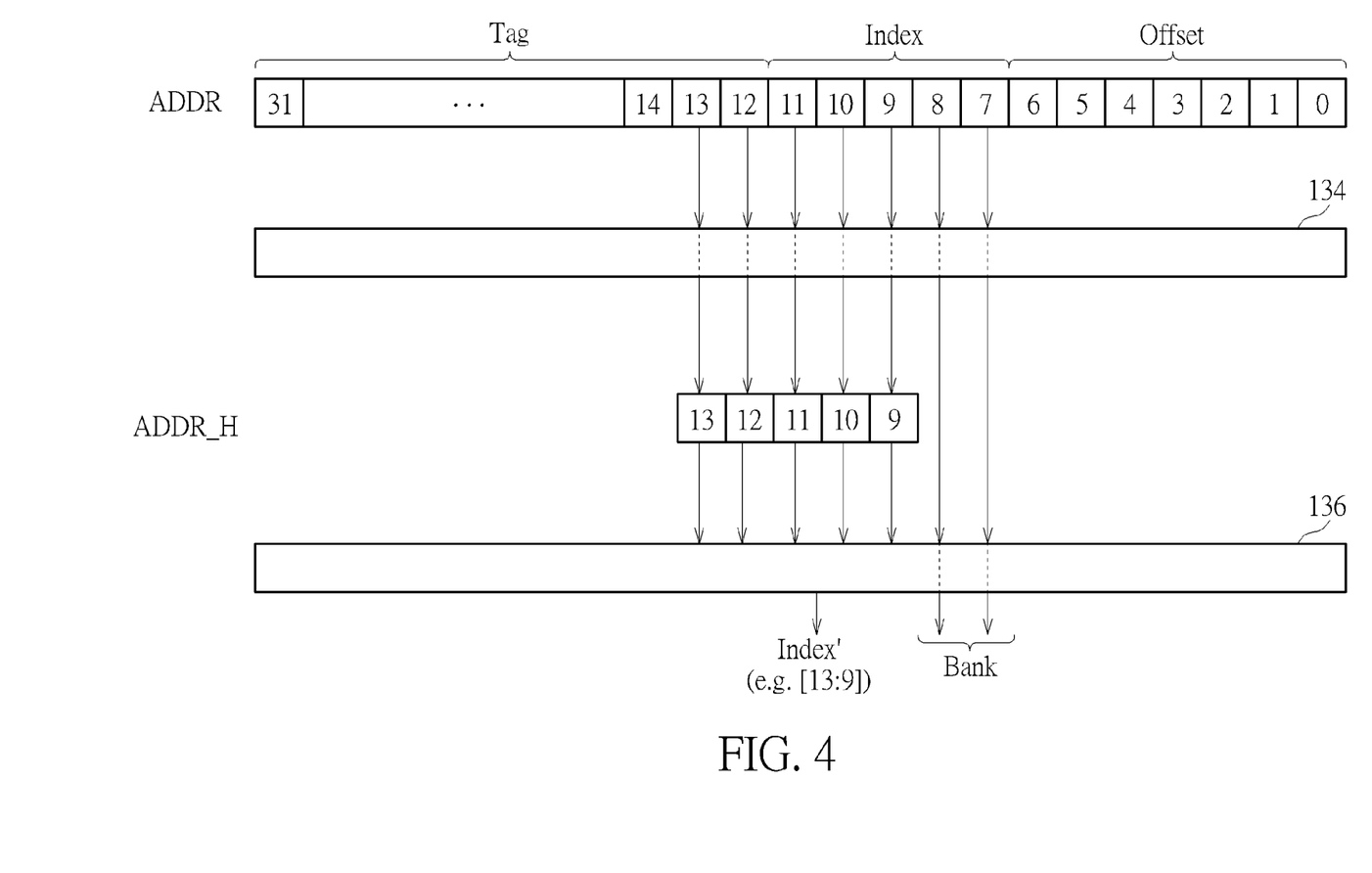
FIG. 4 is a diagram illustrating a bit shift operation for hashing address bits excluding bank information according to an embodiment of the present invention.

FIG. 4 is a diagram illustrating a bit shift operation for hashing address bits excluding bank information according to an embodiment of the present invention. In this example, the original bank information (i.e., address bits [8:7] in the original memory address ADDR) is kept. In other words, the programmable bit shift operation does not take address bits [8:7] as its input. The hashing address logic 134 may refer to a cache size of the cache 104 to adaptively set the number of address bits that are selected from the 32-bit memory address ADDR to be processed by the programmable bit shift operation. In this example, the cache size of the cache 104 is equal to 4K bytes (i.e., 8K bits×4), and there are 32 128-byte cache lines. The number of address bits selected from the 32-bit memory address ADDR to be processed by the programmable bit shift operation may be set by 5 (i.e., $\text{Log}_2 32=5$). Further, as mentioned above, the number of bit positions shifted or rotated by the bit shift operation is set by zero (i.e., 7–7) due to the 3.2K-byte address offset resulting from the image pitch of the 800×600 image with 32 bpp. Hence, the proposed hashing address logic 136 is configured to process a portion of the memory address ADDR that includes address bits [13:9]. As can be seen from FIG. 4, the address bits [13:9] in the original memory address ADDR are not shifted, such that the hashing address ADDR_H is composed of the address bits [13:9] at the original bit positions.

The control circuit 136 is configured to determine an index Index' of the cache 104 based at least partly on the hashing address ADDR_H. In this example, the control circuit 136 may extract address bits [13:9] at the original bit positions as the index Index'. In other words, the address bits [13:9] in the original memory address ADDR is actually used to act as the index Index' (which is derived from the hashing address ADDR_H to find a tag entry 120 in the tag memory 114). It should be noted that the tag address used for tag comparison is still derived from the original memory address ADDR. That is, the cache controller 106 compares address bits [31:12] in the original memory address ADDR with a tag address stored in a tag field of the tag entry 120 found using the index Index'.

The hashing address logic 134 may refer to a cache size of a cache to adaptively set the number of address bits that are selected from an original memory address to be processed by the programmable bit shift operation. When the cache controller 106 is used in another electronic device equipped with a cache having a different cache size, the number of address bits selected to be processed by the programmable bit shift operation will be adjusted correspondingly.

Figure 5:
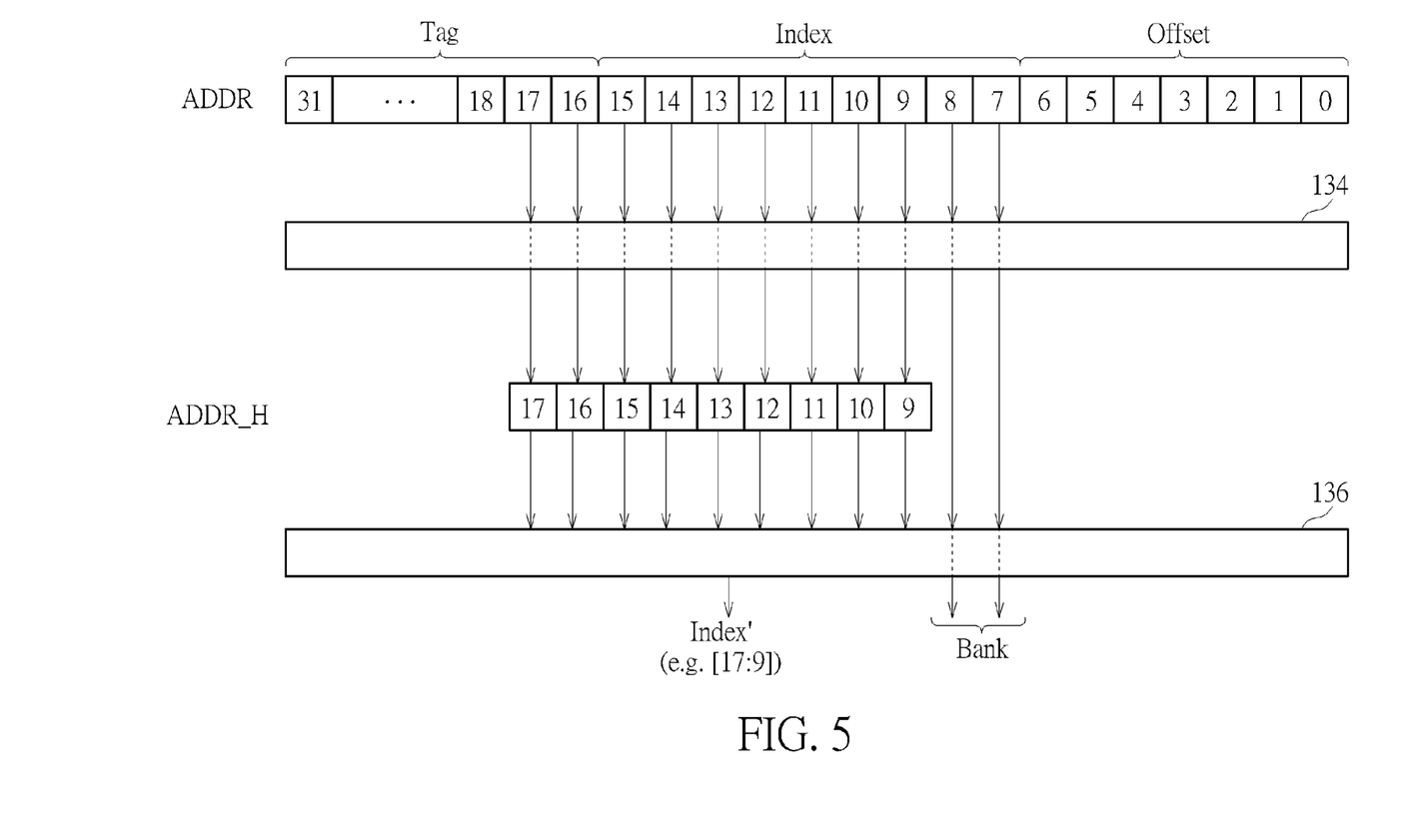
FIG. 5 is a diagram illustrating another bit shift operation for hashing address bits excluding bank information according to an embodiment of the present invention.

FIG. 5 is a diagram illustrating another bit shift operation for hashing address bits excluding bank information according to an embodiment of the present invention. In this example, the data memory 112 of the cache 104 may have 4 banks 116, each bank 116 may have 128 cache lines 118, and each cache line 118 may have 1K bits (i.e., 128 bytes). Hence, the cache size is equal to 64K bytes (i.e., 128K bits×4). For a 32 bpp linear address surface (image), there is an 800×600 image, and each bin of the 800×600 image is a 32×32 image. The byte count of the image pitch is 3.2K bytes (i.e., 800×4 bytes). Further, the cache 104 may employ a direct mapping scheme, and each of the processors 102_1-102_N is a 32-bit processor. Since the number of cache lines 118 in the data memory 112 of the cache 104 is 512 (i.e., $2^9$), the number of address bits selected to be processed by the programmable bit shift operation may be set by 9 (i.e., $\text{Log}_2 512=9$). Further, as mentioned above, the number of bit positions shifted or rotated by the bit shift operation is set by zero (i.e., 7–7) due to the 3.2K-byte address offset resulting from the image pitch of the 800×600 image with 32 bpp. In this example, the original bank information (i.e., address bits [8:7] in the original memory address ADDR) is kept. Hence, the proposed hashing address logic 136 is configured to process a portion of the memory address ADDR that includes address bits [17:9]. As can be seen from FIG. 5, the address bits [17:9] in the original memory address ADDR are not shifted, such that the hashing address ADDR_H is composed of the address bits [17:9] at the original bit positions.

The control circuit 136 may extract address bits [17:9] at the original bit positions as the index Index'. It should be noted that the tag address used for tag comparison is still derived from the original memory address ADDR. That is, the cache controller 106 is configured to compare address bits [31:16] in the original memory address ADDR with a tag address stored in a tag field of the tag entry 120 found using the cache index Index'.

A memory address of each scan line in the 800×600 image with 32 bpp may be represented by a base address plus an offset. Let's ignore the base address and only consider the offset. The cache indices Index' generated for all scan lines in the 800×600 image with 32 bpp are listed in following table.

TABLE 2

|  | Original offset (Hexadecimal) | 4 KB New offset bits 11:7 after rotating (cross bank) - ror 0 | 4 KB New offset bits 13:9 after rotating bit (keep same bank) - ror 0 | 64 KB New offset bits 17:9 after rotating bits (keep same bank) - ror 0 |
|---|---|---|---|---|
| Scan line 0 | 0x00000000 | 5'b00000 [bank 00] | 5'b00000 [bank 00] | 9'b000000000 [bank 00] |
| Scan line 1 | 0x00000c80 | 5'b11001 [bank 01] | 5'b00110 [bank 01] | 9'b000000110 [bank 01] |
| Scan line 2 | 0x00001900 | 5'b10010 [bank 10] | 5'b01100 [bank 10] | 9'b000001100 [bank 10] |
| Scan line 3 | 0x00002580 | 5'b01011 [bank 11] | 5'b10010 [bank 11] | 9'b000010010 [bank 11] |
| Scan line 4 | 0x00003200 | 5'b00100 [bank 00] | 5'b11001 [bank 00] | 9'b000011001 [bank 00] |
| Scan line 5 | 0x00003e80 | 5'b11101 [bank 01] | 5'b11111 [bank 01] | 9'b000011111 [bank 01] |
| Scan line 6 | 0x00004b00 | 5'b10110 [bank 10] | 5'b00101 [bank 10] | 9'b000100101 [bank 10] |
| Scan line 7 | 0x00005780 | 5'b01111 [bank 11] | 5'b01011 [bank 11] | 9'b000101011 [bank 11] |
| Scan line 8 | 0x00006400 | 5'b01000 [bank 00] | 5'b10010 [bank 00] | 9'b000110010 [bank 00] |
| Scan line 9 | 0x00007080 | 5'b00001 [bank 01] | 5'b11000 [bank 01] | 9'b000111000 [bank 01] |
| Scan line 10 | 0x00007d00 | 5'b11010 [bank 10] | 5'b11110 [bank 10] | 9'b000111110 [bank 10] |
| Scan line 11 | 0x00008980 | 5'b10011 [bank 11] | 5'b00100 [bank 11] | 9'b001000100 [bank 11] |
| Scan line 12 | 0x00009600 | 5'b01100 [bank 00] | 5'b01011 [bank 00] | 9'b001001011 [bank 00] |
| Scan line 13 | 0x0000a280 | 5'b00101 [bank 01] | 5'b10001 [bank 01] | 9'b001010001 [bank 01] |
| Scan line 14 | 0x0000af00 | 5'b11110 [bank 10] | 5'b10111 [bank 10] | 9'b001010111 [bank 10] |
| Scan | 0x0000bb80 | 5'b10111 | 5'b11101 | 9'b001011101 |

TABLE 2-continued

| | Original offset (Hexa-decimal) | 4 KB New offset bits 11:7 after rotating (cross bank) - ror 0 | 4 KB New offset bits 13:9 after rotating bit (keep same bank) - ror 0 | 64 KB New offset bits 17:9 after rotating bits (keep same bank) - ror 0 |
|---|---|---|---|---|
| line 15 | | [bank 11] | [bank 11] | [bank 11] |
| Scan line 16 | 0x0000c800 | 5'b01000 [bank 00] | 5'b00100 [bank 00] | 9'b001100100 [bank 00] |
| Scan line 17 | 0x0000d480 | 5'b01001 [bank 01] | 5'b01010 [bank 01] | 9'b001101010 [bank 01] |
| Scan line 18 | 0x0000e100 | 5'b00010 [bank 10] | 5'b10000 [bank 10] | 9'b001110000 [bank 10] |
| Scan line 19 | 0x0000ed80 | 5'b11011 [bank 11] | 5'b10110 [bank 11] | 9'b001110110 [bank 11] |
| Scan line 20 | 0x0000fa00 | 5'b10100 [bank 00] | 5'b11101 [bank 00] | 9'b001111101 [bank 00] |
| Scan line 21 | 0x00010680 | 5'b01101 [bank 01] | 5'b00011 [bank 01] | 9'b010000011 [bank 01] |
| Scan line 22 | 0x00011300 | 5'b00110 [bank 10] | 5'b01001 [bank 10] | 9'b010001001 [bank 10] |
| Scan line 23 | 0x00011f80 | 5'b11111 [bank 11] | 5'b01111 [bank 11] | 9'b010001111 [bank 11] |
| Scan line 24 | 0x00012c00 | 5'b11000 [bank 00] | 5'b10110 [bank 00] | 9'b010010110 [bank 00] |
| Scan line 25 | 0x00013680 | 5'b10000 [bank 01] | 5'b11100 [bank 01] | 9'b010011100 [bank 01] |
| Scan line 26 | 0x00014500 | 5'b01010 [bank 10] | 5'b00010 [bank 10] | 9'b010100010 [bank 10] |
| Scan line 27 | 0x00015180 | 5'b00011 [bank 11] | 5'b01000 [bank 11] | 9'b010101000 [bank 11] |
| Scan line 28 | 0x00015e00 | 5'b11100 [bank 00] | 5'b01111 [bank 00] | 9'b010101111 [bank 00] |
| Scan line 29 | 0x00016a80 | 5'b10101 [bank 01] | 5'b10101 [bank 01] | 9'b010110101 [bank 01] |
| Scan line 30 | 0x00017700 | 5'b01110 [bank 10] | 5'b11011 [bank 10] | 9'b010111011 [bank 10] |
| Scan line 31 | 0x00018380 | 5'b00111 [bank 11] | 5'b00001 [bank 11] | 9'b011000001 [bank 11] |

In above examples, the hashing address ADDR_H is referenced to generate a cache index (e.g., a set address) of a direct-mapped cache. However, this is for illustrative purposes only, and is not meant to be a limitation of the present invention. After reading above paragraphs, a person skilled in the art should readily appreciate that the proposed cache addressing scheme may be applied to a set-associative cache. Further, using a bitwise rotation manipulation to implementation the programmable hash function is for illustrative purposes only, and is not meant to be a limitation of the present invention. Any formula capable of making the cache index changed for each address offset resulting from an image pitch may be employed by the programmable hash function. These alternative designs fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling access of a cache, comprising:
receiving a memory address that is issued from a request agent;
utilizing a hashing address logic to perform a programmable hash function upon at least a portion of the memory address to generate a hashing address, comprising:
when an image with at least one partial image to be loaded into the cache has a first image size, configuring the programmable hash function by a first hash function setting; and
when the image with the at least one partial image to be loaded into the cache has a second image size different from the first image size, configuring the programmable hash function by a second hash function setting different from the first hash function setting;
setting a hash enable bit in a tag entry of a cache line in the cache to indicate that the programmable hash function has been enabled for the memory address; and
determining an index of the cache based at least partly on the hashing address.

2. The method of claim 1, wherein the programmable hash function is a bit shift operation.

3. The method of claim 2, wherein the bit shift operation is configured to shift or rotate right.

4. The method of claim 2, wherein a number of bit positions shifted or rotated by the bit shift operation is adaptively set based on an image size of an image having at least one partial image to be loaded into the cache.

5. The method of claim 1, wherein the step of perform the programmable hash function comprises:
referring to a cache size of the cache to adaptively set a number of address bits selected from the memory address to act as at least the portion of the memory address.

6. The method of claim 1, wherein the cache has a tag memory including a plurality of banks, at least the portion of the memory address includes at least one address bit originally used for indexing one of the banks, and the hashing address includes at least one address bit actually used for indexing one of the banks.

7. The method of claim 1, wherein the cache has a tag memory including a plurality of banks, the memory address includes at least one address bit actually used for indexing one of the banks, and the at least the portion of the memory address does not include the at least one address bit.

8. The method of claim 1,
setting a plurality of hash enable bits in a tag entry of a cache line in the cache for a plurality of different request agents, respectively;
wherein each of the hash enable bits indicates whether a designated programmable hash function has been enabled for a memory address issued from a corresponding request agent.

9. A cache controller for controlling access of a cache, comprising:
an input interface, configured to receive a memory address that is issued from a request agent;
a hashing address logic, configured to perform a programmable hash function upon at least a portion of the memory address to generate a hashing address; and
a control circuit, configured to determine an index of the cache based at least partly on the hashing address and set a hash enable bit in a tag entry of a cache line in the cache to indicate that the programmable hash function has been enabled for the memory address;
wherein when an image with at least one partial image to be loaded into the cache has a first image size, the hashing address logic performs the programmable hash function configured by a first hash function setting; and when the image with the at least one partial image to be loaded into the cache has a second image size different from the first image size, the hashing address logic performs the programmable hash function configured by a second hash function setting different from the first hash function setting.

10. The cache controller of claim 9, wherein the programmable hash function is a bit shift operation.

11. The cache controller of claim 10, wherein the bit shift operation is configured to shift or rotate right.

12. The cache controller of claim 10, wherein a number of bit positions shifted or rotated by the bit shift operation is adaptively set by the hashing address logic based on an image size of an image having at least one partial image to be loaded into the cache.

13. The cache controller of claim 9, wherein the hashing address logic is configured to refer to a cache size of the cache to adaptively set a number of address bits selected from the memory address to act as at least the portion of the memory address.

14. The cache controller of claim 9, wherein the cache has a tag memory including a plurality of banks, at least the portion of the memory address includes at least one address bit originally used for indexing one of the banks, and the hashing address includes at least one address bit actually used for indexing one of the banks.

15. The cache controller of claim 9, wherein the cache has a tag memory including a plurality of banks, the memory address includes at least one address bit actually used for indexing one of the banks, and the at least the portion of the memory address does not include the at least one address bit.

16. The cache controller of claim 9, wherein set the hash enable bit comprises:
 a control circuit, configured to set a plurality of hash enable bits in a tag entry of a cache line in the cache for a plurality of different request agents, respectively;
 wherein each of the hash enable bits indicates whether a designated programmable hash function has been enabled for a memory address issued from a corresponding request agent.

* * * * *